United States Patent
Nakamura et al.

(10) Patent No.: US 11,149,820 B2
(45) Date of Patent: Oct. 19, 2021

(54) ELEMENT DESIGNING METHOD AND POWER TRANSFER BELT

(71) Applicants: AISIN AW CO., LTD., Anjo (JP); TOYOTA JIDOSHA KABUSHIKI KAISHA, Toyota (JP)

(72) Inventors: Ryo Nakamura, Anjo (JP); Akira Ochi, Anjo (JP); Takayuki Miyake, Okazaki (JP); Junichi Tokunaga, Anjo (JP); Keisuke Ninomiya, Susono (JP); Yu Inase, Susono (JP); Fumiya Kaji, Susono (JP); Yuji Hattori, Ichinomiya (JP); Yuji Nagasawa, Nagakute (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/483,326

(22) PCT Filed: Mar. 5, 2018

(86) PCT No.: PCT/JP2018/008385
§ 371 (c)(1),
(2) Date: Aug. 2, 2019

(87) PCT Pub. No.: WO2018/159858
PCT Pub. Date: Sep. 7, 2018

(65) Prior Publication Data
US 2020/0011398 A1    Jan. 9, 2020

(30) Foreign Application Priority Data
Mar. 3, 2017  (JP) .............................. JP2017-040744

(51) Int. Cl.
*F16G 5/16*    (2006.01)

(52) U.S. Cl.
CPC ................ *F16G 5/16* (2013.01); *F16G 5/163* (2013.01)

(58) Field of Classification Search
CPC ............. F16G 5/16; F16G 5/163; F16G 5/166
(Continued)

(56) References Cited

U.S. PATENT DOCUMENTS 4,525,160 A * 6/1985 Okawa ...................... F16G 5/16
474/201
4,526,561 A * 7/1985 Hattori ...................... F16H 9/24
474/201
(Continued)

FOREIGN PATENT DOCUMENTS

JP    2006-009950 A    1/2006
JP    2007-303585 A    11/2007
(Continued)

OTHER PUBLICATIONS

International Search Report of PCTJP2018/008385 dated May 1, 2018.

*Primary Examiner* — Henry Y Liu
(74) *Attorney, Agent, or Firm* — Sughrue Mion, PLLC (57) ABSTRACT

In an element of a power transfer belt to be wound around a primary pulley and a secondary pulley of a continuously variable transmission to transfer torque, the distance from a boundary line between a surface positioned on the outer peripheral side of the power transfer belt with respect to a rocking edge portion and the rocking edge portion to a saddle surface is determined from the slip amount due to micro slip which is relative slipping between the element and the primary pulley caused when the primary pulley pushes out the power transfer belt toward the secondary pulley, and the angular speed of the element and the angular (Continued)

speed of a ring in a range in which the power transfer belt is wound around the secondary pulley.

20 Claims, 5 Drawing Sheets

(58) Field of Classification Search
USPC .................................................. 474/242, 272
See application file for complete search history.

(56) References Cited

U.S. PATENT DOCUMENTS

| | | | | |
|---|---|---|---|---|
| 4,552,548 A * | 11/1985 | Hattori | F16H 9/24 | 474/201 |
| 4,560,370 A * | 12/1985 | Hattori | F16G 5/16 | 474/201 |
| 4,560,371 A * | 12/1985 | Hattori | F16G 5/16 | 474/201 |
| 4,579,547 A * | 4/1986 | McComber | F16G 5/166 | 474/201 |
| 4,618,337 A * | 10/1986 | Okawa | F16G 5/16 | 474/201 |
| 4,698,050 A * | 10/1987 | Hattori | F16G 5/16 | 474/201 |
| 4,741,727 A * | 5/1988 | Hattori | F16G 5/16 | 384/908 |
| 4,758,211 A * | 7/1988 | Hattori | F16G 5/16 | 474/201 |
| 4,824,424 A * | 4/1989 | Ide | F16G 5/16 | 474/201 |
| 4,854,926 A * | 8/1989 | Hattori | F16G 5/16 | 474/242 |
| 4,891,039 A * | 1/1990 | Hattori | F16G 5/16 | 474/242 |
| 4,906,225 A * | 3/1990 | van Lith | F16G 5/16 | 474/242 |
| 5,123,880 A * | 6/1992 | Sekine | F16H 9/24 | 474/244 |
| 5,152,722 A * | 10/1992 | Yamada | F16G 5/16 | 474/240 |
| 6,074,317 A * | 6/2000 | Kobayashi | F16G 5/16 | 474/201 |
| 6,086,499 A * | 7/2000 | Brandsma | F16G 5/16 | 474/201 |
| 6,332,854 B1 * | 12/2001 | Kanokogi | F16G 5/16 | 474/201 |
| 6,334,830 B1 * | 1/2002 | Yagasaki | F16G 5/16 | 474/201 |
| 6,336,884 B1 * | 1/2002 | Wakui | F16G 5/16 | 474/201 |
| 6,440,025 B1 * | 8/2002 | Ohnuki | F16G 5/16 | 474/242 |
| 6,565,469 B1 * | 5/2003 | Aoyama | F16G 5/16 | 474/240 |
| 6,626,782 B1 * | 9/2003 | Ohsono | B21D 53/14 | 474/242 |
| 6,626,783 B1 * | 9/2003 | Shimada | F16G 5/16 | 474/201 |
| 6,645,104 B2 * | 11/2003 | Suzuki | B21D 53/14 | 474/201 |
| 8,100,797 B2 * | 1/2012 | Prinsen | B21D 53/14 | 474/242 |
| 2001/0051554 A1 * | 12/2001 | Kanehara | F16G 5/16 | 474/242 |
| 2002/0025872 A1 * | 2/2002 | Shiba | F16G 5/16 | 474/242 |
| 2002/0137585 A1 * | 9/2002 | Smeets | F16G 5/163 | 474/242 |
| 2002/0138986 A1 * | 10/2002 | Wakui | F16G 5/16 | 29/892 |
| 2003/0032513 A1 * | 2/2003 | Aoyama | F16G 5/16 | 474/242 |
| 2003/0050142 A1 * | 3/2003 | Akagi | F16G 5/16 | 474/242 |
| 2003/0148842 A1 * | 8/2003 | Serkh | F16G 5/166 | 474/242 |
| 2003/0162616 A1 * | 8/2003 | Miura | F16G 5/16 | 474/242 |
| 2004/0053723 A1 * | 3/2004 | Smeets | F16G 5/163 | 474/242 |
| 2004/0082417 A1 * | 4/2004 | Smeets | F16G 5/16 | 474/242 |
| 2004/0106485 A1 * | 6/2004 | Maria Prinsen | F16G 5/16 | 474/242 |
| 2004/0176202 A1 * | 9/2004 | Sakai | F16G 5/16 | 474/242 |
| 2006/0079366 A1 * | 4/2006 | Kanehara | F16G 5/16 | 474/242 |
| 2007/0161447 A1 * | 7/2007 | Shin | F16G 5/16 | 474/242 |
| 2008/0274848 A1 * | 11/2008 | Van Der Leest | F16H 9/24 | 474/201 |
| 2008/0305906 A1 * | 12/2008 | Kobayashi | F16G 5/16 | 474/242 |
| 2009/0054189 A1 * | 2/2009 | Tani | F16G 5/16 | 474/246 |
| 2009/0280940 A1 * | 11/2009 | Toyohara | F16G 5/16 | 474/242 |
| 2010/0227719 A1 * | 9/2010 | Prinsen | B21K 23/00 | 474/148 |
| 2010/0227721 A1 * | 9/2010 | Kato | F16G 5/16 | 474/242 |
| 2012/0036704 A1 * | 2/2012 | Okubo | B21K 23/00 | 29/557 |
| 2012/0277048 A1 * | 11/2012 | Van Der Sluis | F16G 5/16 | 474/242 |
| 2014/0106919 A1 * | 4/2014 | Harima | F16G 5/16 | 474/242 |
| 2014/0371015 A1 * | 12/2014 | Van Der Sluis | F16G 5/16 | 474/240 |
| 2015/0045166 A1 * | 2/2015 | Van Der Sluis | F16G 5/16 | 474/201 |
| 2015/0080157 A1 * | 3/2015 | Sumida | F16H 9/18 | 474/28 |
| 2015/0105194 A1 * | 4/2015 | Sumida | F16H 9/18 | 474/28 |
| 2016/0102732 A1 * | 4/2016 | Yagasaki | F16G 5/16 | 474/242 |
| 2016/0153524 A1 * | 6/2016 | Ando | F16G 5/16 | 474/242 |
| 2017/0159752 A1 * | 6/2017 | Sumida | B21D 35/001 | |
| 2018/0023664 A1 * | 1/2018 | Bransma | F16G 5/18 | 474/8 |
| 2019/0346016 A1 * | 11/2019 | Van Treijen | F16G 5/16 | |

FOREIGN PATENT DOCUMENTS

| | | |
|---|---|---|
| JP | 2008-116009 A | 5/2008 |
| JP | 2010-138984 A | 6/2010 |
| WO | 2016/102073 A1 | 6/2016 |

* cited by examiner

ELEMENT DESIGNING METHOD AND POWER TRANSFER BELT

CROSS REFERENCE TO RELATED APPLICATIONS

This application is a National Stage of international Application No. PCT/JP2018/008385 filed Mar. 5, 2018, claiming priority based on Japanese Patent Application No. 2017-040744 filed Mar. 3, 2017.

TECHNICAL FIELD

The present disclosure relates to a method of designing elements to be bound annularly by a ring of a power transfer belt to be wound around a primary pulley and a secondary pulley of a composite continuously variable transmission to transfer torque, and to a power transfer belt.

BACKGROUND ART

There has hitherto been known a power transfer belt for a continuously variable transmission that includes a plurality of elements that each have a rocking edge portion (contact region) in a projecting curved surface shape (see Patent Document 1, for example). In the power transfer belt, a saddle surface of each of the elements that contacts a ring is disposed between an end portion of the rocking edge portion on the outer peripheral side of the power transfer belt and an end portion of the rocking edge portion on the inner peripheral side of the power transfer belt, more particularly between a line of contact between elements at the time when the winding radius is maximum and a line of contact between elements at the time when the winding radius is minimum.

RELATED-ART DOCUMENTS

Patent Documents

[Patent Document 1] International Patent Application Publication No. 2016/102073

SUMMARY OF THE DISCLOSURE

In the power transfer belt described in Patent Document 1, it is attempted to reduce a friction loss due to relative slipping between the elements and the ring by reducing the angular speed difference between the elements and the ring by shortening the distance between the saddle surface and the line of contact between the elements which are included in the rocking edge portion. However, the analysis conducted by the inventors has revealed that there is still room for improvement of the power transfer efficiency and the durability even after simply shortening the distance between the saddle surface and the line of contact between the elements.

It is therefore an aspect of the present disclosure to further improve the power transfer efficiency and the durability of a power transfer belt wound around a primary pulley and a secondary pulley of a continuously variable transmission.

The present disclosure provides a method of designing an element of a power transfer belt to be wound around a primary pulley and a secondary pulley of a continuously variable transmission to transfer torque, the element having a saddle surface that contacts a ring that bounds a plurality of the elements annularly and a rocking edge portion formed on one of a front surface and a back surface of the element and including a contact line on which adjacent elements contact each other and which serves as a support point for turning motion of the adjacent elements, in which a distance from a boundary line between a surface positioned on an outer peripheral side of the power transfer belt with respect to the rocking edge portion and the rocking edge portion to the saddle surface is determined from a slip amount due to micro slip which is relative slipping between the element and the primary pulley caused when the primary pulley pushes out the power transfer belt toward the secondary pulley, and an angular speed of the element and an angular speed of the ring in a range in which the power transfer belt is wound around the secondary pulley.

For the elements of the power transfer belt which includes the plurality of elements and the ring, when one element is pushed out from the primary pulley toward the secondary pulley in an active arc of the primary pulley, there occurs a phenomenon called micro slip, in which the elements in the active arc may not be moved together with the primary pulley with relative slipping caused between the elements and the primary pulley because of the absence of the pressing force of the one element. In the method according to the present disclosure, in the light of the above, the distance from a boundary line between a surface positioned on the outer peripheral side of the power transfer belt with respect to the rocking edge portion, which includes the contact line, and the rocking edge portion to the saddle surface is determined from the slip amount due to micro slip, and the angular speed of the element and the angular speed of the ring in a range in which the power transfer belt is wound around the secondary pulley. Consequently, the friction loss due to relative slipping between the element and the ring can be further reduced by further reducing the angular speed difference between the element and the ring even if micro slip is caused. As a result, it is possible to further improve the power transfer efficiency of the power transfer belt. Further, the durability of the power transfer belt can also be improved by reducing the friction due to relative slipping between the element and the ring.

DETAILED DESCRIPTION

Now, an embodiment of the present disclosure will be described with reference to the drawings.

Figure 1:
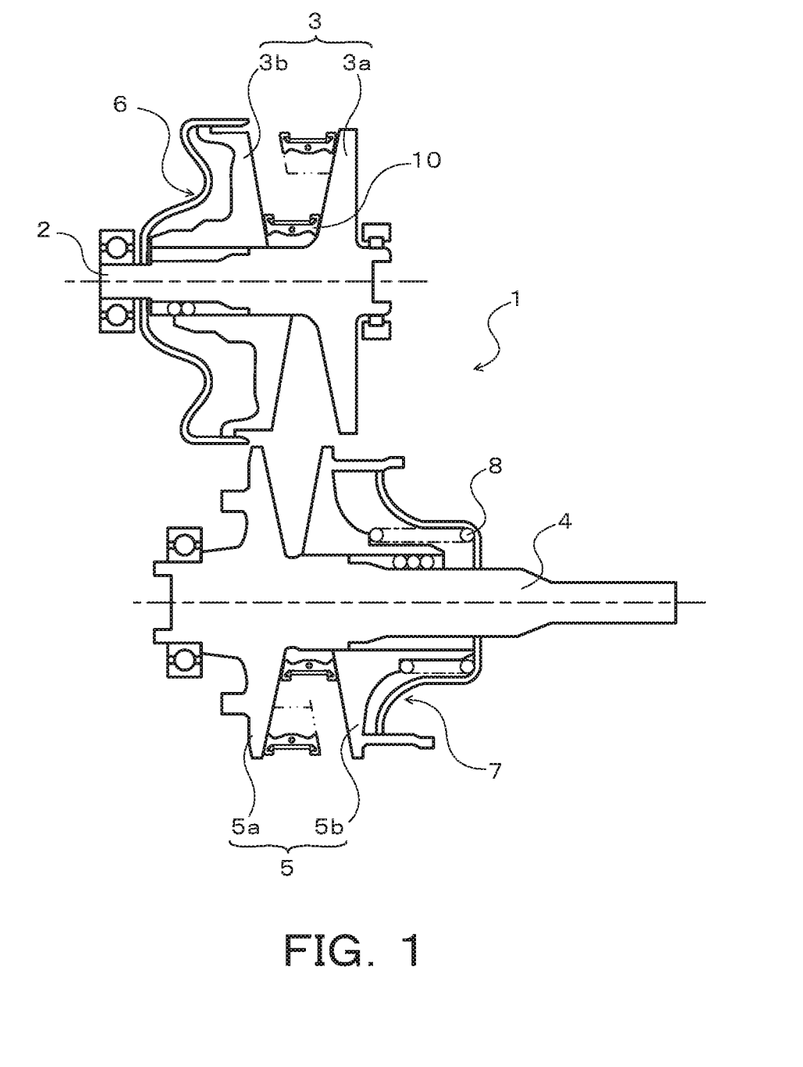
FIG. 1 illustrates a schematic configuration of a continuously variable transmission that includes a power transfer belt according to the present disclosure.

FIG. 1 illustrates a schematic configuration of a continuously variable transmission (CVT) 1 that includes a power transfer belt 10 according to the present disclosure. The continuously variable transmission 1 illustrated in the drawing is to be mounted on a vehicle, and includes a primary shaft 2 that serves as a drive side rotary shaft, a primary pulley 3 (driving side pulley) provided on the primary shaft 2, a secondary shaft 4 that serves as a driven side rotary shaft disposed in parallel with the primary shaft 2, and a secondary pulley 5 (driven side pulley) provided on the secondary shaft 4. As illustrated in the drawing, the power transfer belt 10 is wound around a pulley groove (V groove) of the primary pulley 3 and a pulley groove (V groove) of the secondary pulley 5.

The primary shaft 2 is coupled to an input shaft (not illustrated) coupled to a power generation source such as an engine (internal combustion engine) of the vehicle via a forward/reverse switching mechanism (not illustrated). The primary pulley 3 includes a fixed sheave 3*a* formed integrally with the primary shaft 2, and a movable sheave 3*b* supported by the primary shaft 2 via a ball spline or the like so as to be slidable in the axial direction. Meanwhile, the secondary pulley 5 includes a fixed sheave 5*a* formed integrally with the secondary shaft 4, and a movable sheave 5*b* supported by the secondary shaft 4 via a ball spline or the like so as to be slidable in the axial direction and urged in the axial direction by a return spring 8.

The continuously variable transmission 1 further includes a primary cylinder 6 which is a hydraulic actuator that changes the groove width of the primary pulley 3, and a secondary cylinder 7 which is a hydraulic actuator that changes the groove width of the secondary pulley 5. The primary cylinder 6 is formed behind the movable sheave 3*b* of the primary pulley 3. The secondary cylinder 7 is formed behind the movable sheave 5*b* of the secondary pulley 5. Working oil is supplied from a hydraulic control device (not illustrated) to the primary cylinder 6 and the secondary cylinder 7 in order to vary the groove widths of the primary pulley 3 and the secondary pulley 5. This makes it possible to output torque transferred from the engine or the like to the primary shaft 2 via the input shaft and the forward/reverse switching mechanism with the speed of the torque varied continuously. The torque which is output to the secondary shaft 4 is transferred to drive wheels (neither of which is illustrated) of the vehicle via a gear mechanism, a differential gear, and drive shafts.

Figure 2:
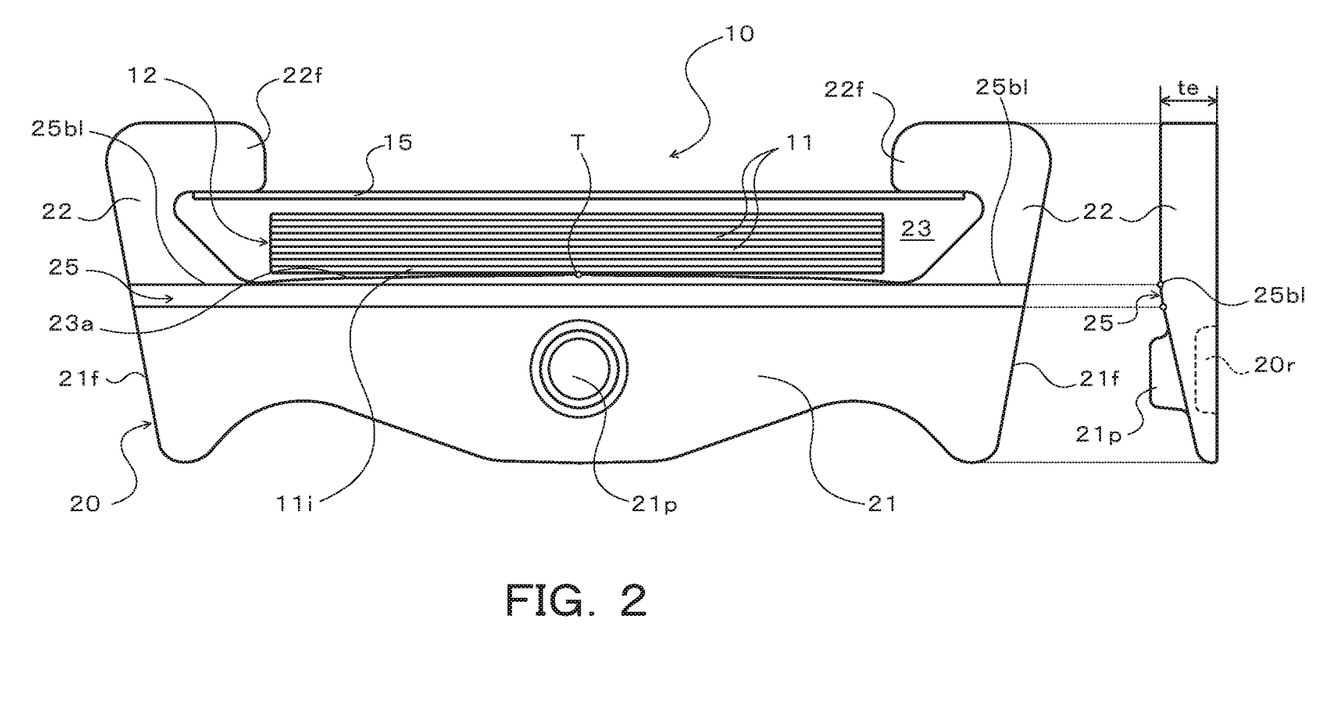
FIG. 2 illustrates a schematic configuration of the power transfer belt according to the present disclosure.

FIG. 2 illustrates a schematic configuration of the power transfer belt 10 according to the present disclosure. The power transfer belt 10 illustrated in the drawing includes one stacked ring 12 constituted by stacking a plurality of (nine in the present embodiment) elastically deformable ring materials 11 in the thickness direction (ring radial direction), one retainer ring 15, and a plurality of (e.g. several hundreds of) elements 20 arranged (bound) annularly along the inner peripheral surface of the stacked ring 12.

The plurality of elastically deformable ring materials 11 which constitute the stacked ring 12 are cut out from a drum made of a steel sheet, and processed so as to have generally equal thicknesses and different circumferential lengths determined in advance. The retainer ring 15, which is elastically deformable, is cut out from a drum made of a steel sheet, for example, and has a thickness that is generally equal to or smaller than that of the ring material 11. In addition, the retainer ring 15 has an inner circumferential length that is longer than the outer circumferential length of the outermost ring material 11 of the stacked ring 12. Consequently, as illustrated in FIG. 2, an annular clearance is formed between the outer peripheral surface of the outermost ring material 11 and the inner peripheral surface of the retainer ring 15 in a state in which the stacked ring 12 and the retainer ring 15 are disposed concentrically (a no-load state in which no tension acts).

Each of the elements 20 has been stamped out from a steel sheet by pressing, for example. As illustrated in FIG. 2, each of the elements 20 has a body portion 21 that extends horizontally in the drawing, a pair of pillar portions 22 that extend in the same direction from both end portions of the body portion 21, and a single ring accommodation portion (recessed portion) 23 defined between the pair of pillar portions 22 so as to open on the free end side of the pillar portions 22. The pair of pillar portions 22 extend outward (direction from the inner peripheral side toward the outer peripheral side of the power transfer belt 10, i.e. upward in the drawing) in the radial direction of the power transfer belt 10 from both sides, in the width direction, of a saddle surface 23*a* which is the bottom surface of the ring accommodation portion 23. Hook portions 22*f* that project in the width direction of the saddle surface 23*a* are formed at free end portions of the pillar portions 22. The pair of hook portions 22*f* face each other with a spacing that is slightly larger than the width of the stacked ring 12 (ring materials 11) and that is smaller than the width of the retainer ring 15.

As illustrated in FIG. 2, the stacked ring 12 is disposed in the ring accommodation portion 23, and the saddle surface 23*a* of the ring accommodation portion 23 contacts the inner peripheral surface of an innermost ring material 11*i* that constitutes the stacked ring 12. The saddle surface 23*a* has a transversely symmetrical convex curved surface shape (crowning shape) in which the saddle surface 23*a* is gently inclined downward in the drawing from the center portion in the width direction as a top portion T toward the outer sides in the width direction. Consequently, it is possible to center the stacked ring 12 by applying a centripetal force directed to the top portion T to the stacked ring 12 through friction with the saddle surface 23*a*. It should be noted, however, that the saddle surface 23*a* may include a plurality of convex curved surfaces curved outward in the radial direction of the stacked ring 12. The retainer ring 15 is elastically deformed to be fitted with the ring accommodation portion 23 via the gap between the pair of hook portions 22*f* of each of the elements 20. The retainer ring 15 is disposed between the outer peripheral surface of the outermost ring material 11 of the stacked ring 12 and the hook portions 22*f* of each of the elements 20 to surround the stacked ring 12, and regulates slipping-off of each of the elements 20 from the stacked ring 12. Consequently, the plurality of elements 20 are bound (arranged) annularly along the inner peripheral surface of the stacked ring 12.

Further, the front surface (one surface) of the element 20 includes a rocking edge portion (contact region) 25 that includes a contact line on which adjacent elements 20 contact each other and which serves as a support point for turning motion of the adjacent elements 20. In the present embodiment, the rocking edge portion 25 is a band-like convex curved surface provided on the belt outer peripheral side (upper side in FIG. 2) of the body portion 21, and the position of the contact line is fluctuated in the range of the rocking edge portion 25 in accordance with a speed ratio γ of the continuously variable transmission 1. In the present embodiment, the rocking edge portion 25 is a circular column surface that has a radius of curvature $r_{RE}$ determined in advance. In the present embodiment, in addition, the front surface (mainly the front surface of the pillar portions 22) of the element 20 which is positioned on the belt outer peripheral side with respect to the rocking edge portion 25 and the back surface (other surface) of the element 20 are formed to be flat, and the pillar portions 22 of the element 20 have a constant thickness te. Further, the front surface (mainly the front surface of the body portion 21) of the element 20 which is positioned on the belt inner peripheral side (lower side in FIG. 2) with respect to the rocking edge portion 25 is formed so as to become closer to the back surface toward the belt inner peripheral side. The rocking edge portion 25 may be formed on the back surface (other surface) of the element 20.

In addition, one protrusion (dimple) 21p is formed at the center portion, in the width direction, of the front surface of the body portion 21, and a dent 21r is formed in the back surface of the body portion 21 so as to be positioned on the back side of the protrusion 21p. Further, the body portion 21 of the element 20 has a pair of side surfaces 21f formed so as to extend away from each other from the inner peripheral side toward the outer peripheral side (outer side in the radial direction of the power transfer belt 10 etc.) of the power transfer belt 10 etc. and configured to function as flank surfaces (torque transfer surfaces). The surfaces of the side surfaces 21f are provided with recesses and projections (a plurality of grooves) (not illustrated) formed so as to hold working oil for lubricating and cooling a contact portion between the element 20 and the primary pulley 3 and the secondary pulley 5.

Next, the procedure for designing the element 20 discussed above will be described.

Figure 3:
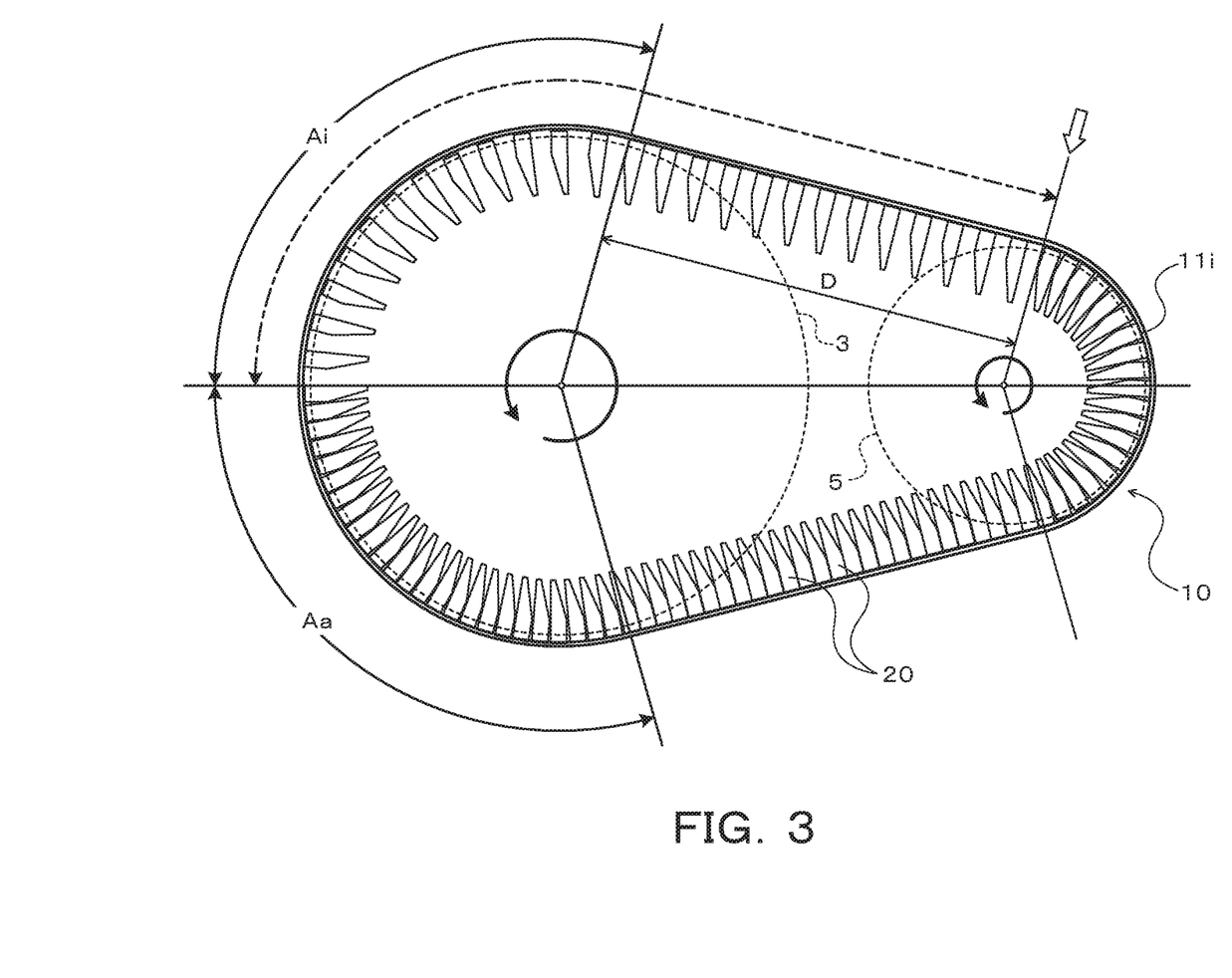
FIG. 3 is a schematic diagram illustrating the power transfer belt according to the present disclosure.

In the power transfer belt 10 (only the innermost ring material 11i is illustrated in FIG. 3) which includes the plurality of elements 20, as illustrated in FIG. 3, a slight clearance is formed between adjacent elements 20 on the primary pulley 3 side with respect to the exit (the position of disengagement from the secondary pulley 5; see the white arrow in the drawing) from the secondary pulley 5. Therefore, a region called an idle arc Ai, in which no torque is transferred with no pressing force generated between the elements 20 because of the presence of the clearance, and a region called an active arc Aa, in which torque is transferred with a pressing force generated between the elements 20 which are brought closer to eliminate the clearance between the elements 20, are formed around the primary pulley 3.

In the idle arc Ai, the elements 20 and the stacked ring 12 are rotated together with the primary pulley 3, and the angular speed of the elements 20 and the angular speed of the stacked ring 12 coincide with each other. In the active arc Aa, in contrast, when one element 20 is pushed out from the primary pulley 3 toward the secondary pulley 5 (disengaged from the primary pulley), there occurs a phenomenon called micro slip, in which the elements 20 in the active arc Aa may not be moved together with the primary pulley 3 (delayed with respect to the primary pulley 3) with relative slipping caused between the elements 20 and the primary pulley 3 because of the absence of the pressing force of the one element. The angular speed of the elements 20 in the active arc Aa is lower than the angular speed of the elements 20 and the stacked ring 12 in the idle arc Ai by an amount corresponding to the slip amount due to the micro slip.

That is, when the angular speed of the innermost ring material 11i of the stacked ring 12 in the idle arc Ai (primary pulley 3) is defined as "ωrp", and the angular speed of the elements 20 in the idle arc Ai is defined as "ωei", the relationship ωrp=ωei is established in the idle arc Ai. Further, when the slip amount due to the micro slip is defined as "Δx", the thickness of the elements 20 is defined as "te" as discussed above, and the angular speed of the elements 20 in the active arc Aa is defined as "ωea", the angular speed ωea can be represented by the following formula (1).

[Expression 1]

$$\omega ea = \frac{te}{te + \Delta x} \cdot \omega ei = \frac{te}{te + \Delta x} \cdot \omega rp \quad (1)$$

The slip amount Δx due to the micro slip in the formula (1) can be a value (Δx>0) obtained by dividing the total value (end play) of the clearances between the adjacent elements 20 by the number of the elements 20 which are positioned in a section (range indicated by the dash-and-dot line in FIG. 3) from the exit of the secondary pulley 5 discussed above to the terminal end of the idle arc Ai. Thus, it is understood from the formula (1) that the angular speed ωea of the elements 20 is lower than the angular speed ωrp of the stacked ring 12 (innermost ring material 11i) for the primary pulley 3. When the rotational speeds of the primary pulley 3 and the secondary pulley 5 are high, or when the speed ratio γ (the ratio in winding radius between the primary pulley 3 and the secondary pulley 5) of the continuously variable transmission 1 is low, the clearances between the adjacent elements 20 are occasionally reduced in a slack region from the exit from the secondary pulley 5 to the entrance to the primary pulley 3. Thus, the slip amount Δx may be a value obtained by dividing the total value of the clearances between the adjacent elements 20 by the number of the elements 20 which are positioned in a section from the exit of the secondary pulley 5 discussed above to the terminal end of the idle arc Ai and further multiplying the resulting quotient by a coefficient that matches the rotational speeds or the speed ratio γ.

Figure 4:
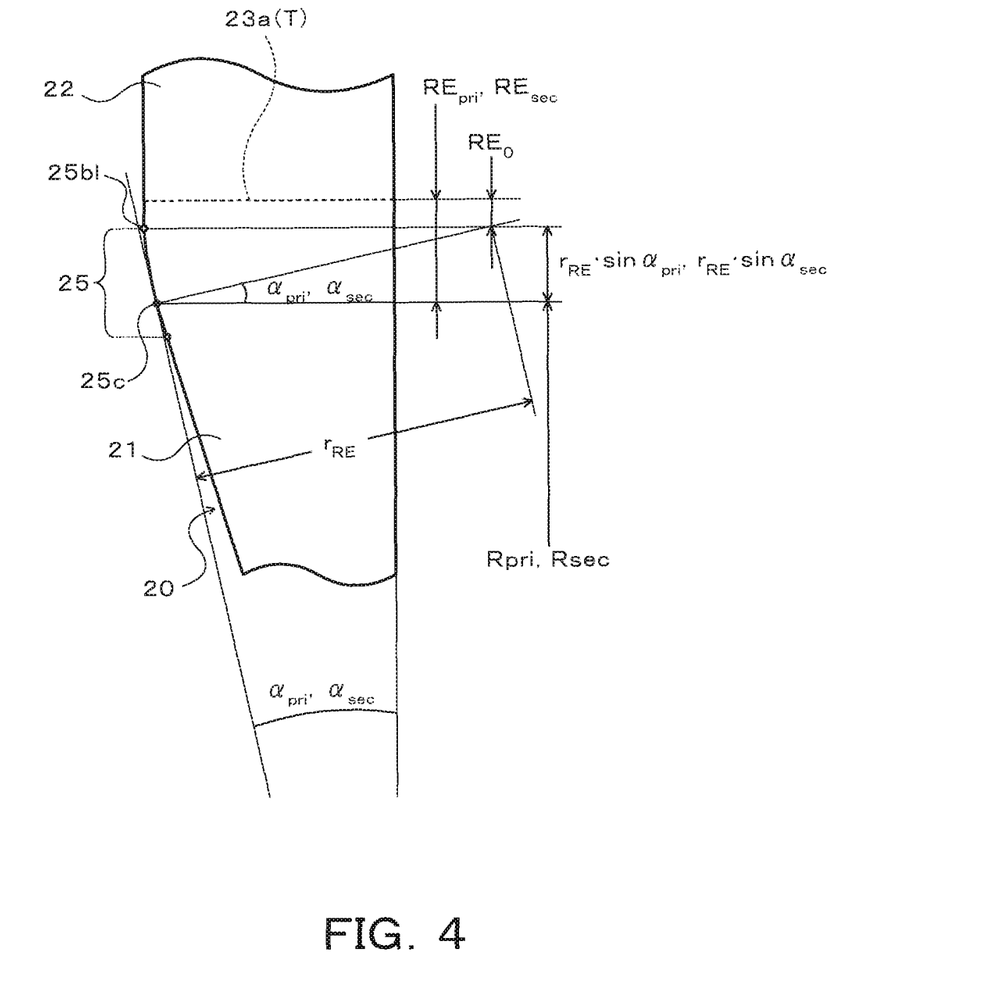
FIG. 4 is an enlarged view illustrating an element of the power transfer belt according to the present disclosure.

As illustrated in FIG. 4, on the other hand, when the angular speed of the innermost ring material 11i of the stacked ring 12 on the secondary pulley 5 is defined as "ωrs", the winding radius around the primary pulley 3 is defined as "Rpri", the winding radius around the secondary pulley 5 is defined as "Rsec", the distance from a contact line 25c in the rocking edge portion 25 of the element 20 which is wound around the primary pulley 3 to the saddle surface 23a is defined as "$RE_{pri}$", the distance from the contact line 25c in the rocking edge portion 25 of the element 20 which is wound around the secondary pulley 5 to the saddle surface 23a is defined as "$RE_{sec}$", the distance from a boundary line 25b1 (see FIGS. 2 and 4) between a surface (mainly the front surface of the pillar portion 22) of the element 20 positioned on the belt outer peripheral side with respect to the rocking edge portion 25 and the rocking edge portion 25 to the saddle surface 23a is defined as "$RE_0$", the angle between the adjacent elements 20 which are wound around the primary pulley 3 is defined as "$\alpha_{pri}$", and the angle between the adjacent elements 20 which are wound around the secondary pulley 5 is defined as "$\alpha_{sec}$", the angular speed ωrs of the innermost ring material 11i on the secondary pulley 5 can be represented by the following formula (2).

[Expression 2]

$$\omega rs = \frac{Rpri + RE_{pri}}{R \sec + Re_{sec}} \cdot \omega rp = \frac{Rpri + RE_0 + r_{RE} \cdot \sin\alpha_{pri}}{R \sec + RE_0 + r_{RE} \cdot \sin\alpha_{sec}} \cdot \omega rp \quad (2)$$

In the formula (2), (Rpri+$RE_{pri}$)/($R_{sec}$+$RE_{sec}$) is the reciprocal of the ratio in winding radius around die innermost ring material 11i between the primary pulley 3 and the secondary pulley 5. The winding radius Rpri around the primary pulley 3 is the distance from the center of the primary pulley 3 to the contact line 25c which is calculated on the basis of the distance from the center (axis) of the primary pulley 3 to the boundary line 25b1 of the element 20 which is wound around the primary pulley 3 and the speed ratio γ of the continuously variable transmission 1. The winding radius Rsec around the secondary pulley 5 is the distance from the center of the secondary pulley 5 to the contact line 25c which is calculated on the basis of the distance from the center (axis) of the secondary pulley 5 to the boundary line 25b1 of the element 20 which is wound around the secondary pulley 5 and the speed ratio γ of the continuously variable transmission 1. The distances $RE_{pri}$, $RE_{sec}$, and $RE_0$ can be distances in the direction f extension of the flat back surface of the element 20 or the front surface of the pillar portion 22 as illustrated in FIG. 4. Further, the angles $α_{pri}$ and $α_{sec}$ can be angles between the respective back surfaces of the adjacent elements 20 which are wound around the primary pulley 3 or the secondary pulley 5.

When the angular speed of the element 20 which is wound around the secondary pulley 5 is defined as "ωes", the angular speed toes can be represented by the following formula (3). As is seen from the formula (3) and the above formula (2), the angular speed ωes of the element 20 may be lower than the angular speed ωrs of the innermost ring material 11i (stacked ring 12) also for the secondary pulley 5, depending on the value of the distance $RE_0$ from the boundary line 25b1 to the saddle surface 23a. "Rpri/Rsec" in the formula (3) is the reciprocal of the winding ratio (=Rsec/Rpri) between the winding radius Rpri around the primary pulley 3 and the winding radius Rsec around the secondary pulley 5 which coincides with the speed ratio γ of the continuously variable transmission 1. When the speed ratio γ of the continuously variable transmission 1 is less than a value of 1 (Rsec<Rpri), the angular speed difference between the element 20 and the innermost ring material 11i, which is due to the micro slip in the active arc Aa, may be amplified on the secondary pulley 5 side.

[Expression 3]

$$\omega es = \frac{Rpri}{R\sec} \cdot \omega ea = \frac{Rpri}{R\sec} \cdot \frac{te}{te + \Delta x} \cdot \omega rp \qquad (3)$$

As discussed above, the micro slip in the active arc Aa can be a factor that causes an angular speed difference between the element 20 and the innermost ring material 11i (stacked ring 12), which hinders a further reduction in the friction loss due to relative slipping between the element 20 and the innermost ring material 11i (stacked ring 12). In addition, the angular speed (circumferential speed) of a ring material 11 that contacts the radially outer side of the innermost ring material 11i, among the ring materials 11 which form the stacked ring 12, is lower than the angular speed (circumferential speed) of the innermost ring material 11i. When the angular speed ωea of the element 20 in the active arc Aa becomes lower than the angular speed ωrp of the innermost ring material 11i because of the micro slip, further, the angular speed (circumferential speed) of the element 20 becomes lower than the angular speed (circumferential speed) of the innermost ring material 11i in the range from the exit from the active arc Aa (primary pulley 3) to the entrance to the idle arc Ai (primary pulley 3). Therefore, in the case where the element 20 is designed without considering the slip amount Δx due to the micro slip, the direction of a friction force generated between the innermost ring material 11i of the stacked ring 12 and the element 20 and the direction of a friction force generated between the innermost ring material and a ring material 11 that contacts the radially outer side of the innermost ring material 11i may be the same as each other. In the power transfer belt 10, in the light of the above, the distance $RE_0$ from the boundary line 25b1 between a surface positioned on the belt outer peripheral side with respect to the rocking edge portion 25, which includes the contact line, and the rocking edge portion 25 to the saddle surface 23a (top portion T) is determined in consideration of the slip amount Δx due to the micro slip.

In the power transfer belt 10, more particularly, the slip amount Δx due to the micro slip at the time when the speed ratio γ of the continuously variable transmission 1 is a target speed ratio that is less than a value of 1, for example, and the winding radii Rpri and Rsec are calculated, and the distance $RE_0$ from the boundary line 25b1 to the saddle surface 23a is determined so as to meet the following formula (4). That is, in the power transfer belt 10, the distance $RE_0$ is determined such that the angular speed ωes (see the formula (3)) of the element 20, which is determined in consideration of the slip amount Δx due to the micro slip at the time when the speed ratio γ of the continuously variable transmission 1 is less than a value of 1, is not lower than the angular speed ωrs (see the formula (2)) of the innermost ring material 11i of the stacked ring 12, more preferably the angular speed ωes coincides with or is slightly higher than the angular speed ωrs, in the range from the exit of the active arc Aa (primary pulley 3) to the entrance to the idle arc Ai (primary pulley 3) which includes a range in which the power transfer belt 10 is wound around the secondary pulley 5. Consequently, the friction loss due to relative slipping between the element 20 and the stacked ring 12 can be further reduced by further reducing the angular speed difference between the element 20 and the innermost ring material 11i even if micro slip is caused in the active arc Aa. By determining the angular speed ωes (see the formula (3)) of the element 20 so as to coincide with or be slightly higher than the angular speed ωrs (see the formula (2)) of the innermost ring material 11i, further, it is possible to make the friction force generated between the innermost ring material 11i of the stacked ring 12 and the element 20 substantially zero, or make the friction force generated between the innermost ring material 11i and the element 20 and the friction force generated between the innermost ring material 11i and a ring material 11 that contacts the radially outer side of the innermost ring material 11i opposite in direction to each other. Consequently, the durability of the power transfer belt 10 can be further improved while securing a high power transfer efficiency of the power transfer belt 10. In the power transfer belt described in Patent Document 1, micro slip in the active arc is not taken into consideration for the angular speed of the element 20. Therefore, the angular speed of the element may be lower than the angular speed of the innermost ring material of the stacked ring in the range of engagement with the secondary pulley. Thus, with the power transfer belt described in Patent Document 1, the functions and the effects of the present disclosure to further improve the durability of the power transfer belt while securing the power transfer efficiency may not be obtained.

[Expression 4]

$$\frac{Rpri}{R\sec} \cdot \frac{te}{te + \Delta x} \geq \frac{Rpri + RE_0 + r_{RE} \cdot \sin\alpha_{pri}}{R\sec + RE_0 + r_{RE} \cdot \sin\alpha_{sec}} \qquad (4)$$

The distances $RE_{pri}$ and $RE_{sec}$ in the above formula (2) which meet $RE_{pri} = RE_0 + r_{RE} \cdot \sin\alpha_{pri}$ or $RE_{sec} = RE_0 + r_{RE} \cdot \sin\alpha_{sec}$ are calculated so as to meet the above formula (4) and the following formula (5). The formula (5) is a relational formula that indicates that a circumferential length L of the innermost ring material 11*i* coincides with the circumferential length of arcs and chords that pass through the top portions of the saddle surfaces 23*a* of all the elements 20. The power transfer efficiency of the power transfer belt 10 is optimized in the case where the values on the left side and the right side of the formula (4) are equal to each other and the formula (5) is met. In the formula (5), when the distance between the center (axis) of the primary pulley 3 and the center (axis) of the secondary pulley 5 is defined as "D" (see FIG. 3), an angle $\theta_{pri}$ is represented. as $\theta=2\cdot\cos^{-1}$(Rsec–Rpri)/D)=$2\cdot\cos^{-1}$(Rpri·($\gamma$–1))/D), and an angle $\theta_{sec}$ is represented as $\theta=2\pi\cdot 2\cdot\cos^{-1}$(Rsec–Rpri)/D)=$2\pi-2\cdot\cos^{-1}$(Rpri·($\gamma$–1))/D). In the formula (4), further, "sin $\alpha_{pri}$" may be approximated as sin $\alpha_{pri}$=te/Rpri, and "sin $\alpha_{sec}$" may be approximated as sin $\alpha_{sec}$=te/Rsec=te/($\gamma$·Rpri).

[Expression 5]

$$L=(\text{Rpri}+\text{RE}_{pri})\cdot\theta_{pri}+(\text{R sec}+\text{RE}_{sec})\cdot\theta_{sec}+2\cdot\sqrt{D^2-\{(\text{Rsec}+\text{RE}_{sec})-(\text{Rpri}+\text{RE}_{pri})\}^2} \quad (5)$$

The target speed ratio that is less than a value of 1 discussed above may be the lowest speed ratio of the continuously variable transmission 1. Consequently, it is possible to further improve the fuel efficiency of the vehicle on which the continuously variable transmission 1 is mounted. Further, the target speed ratio may be a speed ratio at the time when the vehicle speed of the vehicle on which the continuously variable transmission 1 is mounted is the maximum vehicle speed. Consequently, it is possible to further improve the efficiency and the durability at the time when the vehicle on which the continuously variable transmission 1 is mounted travels at a high speed. In this manner, it is possible to further improve the power transfer efficiency and the durability of the power transfer belt 10 by determining the distance $RE_0$ from the boundary line 25*b*1 to the saddle surface 23*a* in consideration of the slip amount due to the micro slip at the time when the speed ratio $\gamma$ of the continuously variable transmission 1 is less than a value of 1. However, it is a matter of course that the target speed ratio is determined as desired in a range that can be set in the continuously variable transmission 1. That is, the distance $RE_0$ from the boundary line 25*b*1 to the saddle surface 23*a* may be determined in consideration of the slip amount due to the micro slip at the time when the speed ratio $\gamma$ of the continuously variable transmission 1 is a target speed ratio that is equal to or more than a value of 1.

Figure 5:
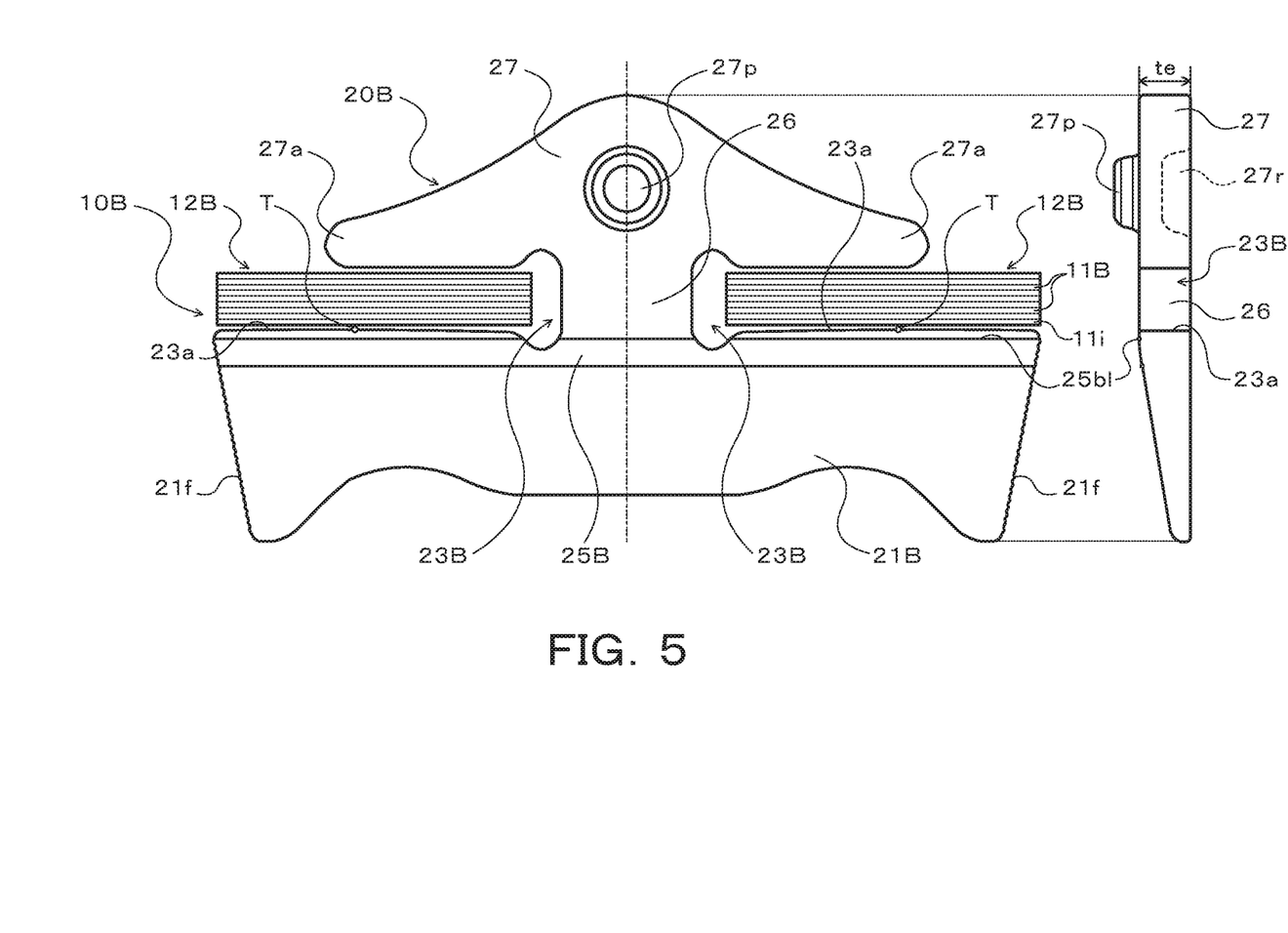
FIG. 5 illustrates a schematic configuration of a different power transfer belt according to the present disclosure.

While the invention according to the present disclosure has been described so far using the power transfer belt 10 which includes the elements 20 in which the pair of pillar portions 22 extend from the body portion 21 as an example, the invention according to the present disclosure may also be applied to a power transfer belt 10B illustrated in FIG. 5.

The power transfer belt 10B illustrated in FIG. 5 includes two stacked rings 12B each constituted by stacking a plurality of (e.g. nine) elastically deformable ring materials 11B in the thickness direction (ring radial direction), and a plurality of (e.g. several hundreds of) elements 20B arranged (bound) annularly along the inner peripheral surfaces of the stacked rings 12B. The plurality of elastically deformable ring materials 11B which constitute the stacked rings 12 are cut out from a drum made of a steel sheet, and processed so as to have generally equal thicknesses and different circumferential lengths determined in advance. The ring materials 11B are each curved gently such that the center portion thereof in the axial direction slightly projects radially outward.

Each of the elements 20B has been stamped out from a steel sheet by pressing, for example. As illustrated in FIG. 5, each of the elements 20B has a body portion 21B that extends horizontally in the drawing and that has a pair of side surfaces 21*f* that serve as flank surfaces, a neck portion 26 that extends from the center portion, in the width direction, of the body portion 21B toward the outer peripheral side of the power transfer belt 10B, and a head portion 27 that has a pair of ear portions 27*a* that extend from the neck portion 26 toward both sides, in the width direction, of the body portion 21B with spacing from the body portion 21B. As illustrated in the drawing, the width of the body portion 21B is the same as or slightly larger than the width of the head portion 27, and two ring accommodation portions (recessed portions) 23B are defined by the body portion 21B, the neck portion 26, and the ear portions 27*a* of the head portion 27. In addition, one protrusion (dimple) 27*p* is formed at the center portion, in the width direction, of the front surface of the head portion 27, and a dent 27*r* is formed in the back surface of the head portion 27 so as to be positioned on the back side of the protrusion 27*p*.

The stacked rings 12B are fitted with the ring accommodation portions 23B of each of the elements 20B such that the element 20B (neck portion 26) is interposed therebetween, and the protrusion 27*p* of the element 20B is freely fitted with the dent 23*r* of the adjacent element 20B. Consequently, a multiplicity of elements 20B are bound as arranged annularly by the two stacked rings 12B. A surface (the upper surface in FIG. 5) of the body portion 21B that defines the ring accommodation portion 23B serves as the saddle surface 23*a* which contacts the inner peripheral surface of the stacked ring 12B (innermost ring material 11*i*). That is, the saddle surface 23*a* is disposed on both sides, in the width direction, of the neck portion 26.

Each of the saddle surfaces 23*a* has a transversely symmetrical convex curved surface shape (crowning shape) in which the saddle surface 23*a* is gently inclined downward in the drawing from the vicinity of the center portion in the width direction as the top portion T toward the outer side in the width direction and the neck portion 26. Consequently, it is possible to center the stacked ring 12B by applying a centripetal force directed to the top portion T to the stacked ring 12B through friction with the saddle surface 23*a*. It should be noted, however, that the saddle surface 23*a* may include a plurality of convex curved surfaces curved outward in the radial direction of the power transfer belt 10B etc. In the example in FIG. 5, the radius of curvature of the saddle surface 23*a* (convex curved surface) is determined to be smaller than the radius of curvature of the curve, along the axial direction, of the innermost ring material 11*i* (stacked ring 12B).

Further, the front surface (one surface) of the element 20B is formed with a rocking edge portion 25B that includes a contact line on which adjacent elements 20B contact each other and which serves as a support point for turning motion of the adjacent elements 20B. The rocking edge portion 25B is a band-like convex curved surface provided on the belt outer peripheral side (upper side in FIG. 5) of the body portion 21B. In addition, the front surface (the front surface of a part of the body portion 21B, the neck portion 26, and the head portion 27) of the element 20B which is positioned on the belt outer peripheral side with respect to the rocking edge portion 25B and the back surface (other surface) of the element 20B are formed to be flat, and the neck portion 26, the head portion 27, etc. of the element 20B have a constant thickness te. Further, the front surface of the body portion 21B which is positioned on the belt inner peripheral side (lower side in FIG. 5) respect to the rocking edge portion 25B is formed so as to become closer to the back surface toward the belt inner peripheral side.

Also in such an element 20B, as in the element 20, the distance $RE_O$ from the boundary line 25b1 between a surface positioned on the belt outer peripheral side with respect to the rocking edge portion 25B, which includes the contact line, and the rocking edge portion 25B to the saddle surface 23a (top portion T) is determined in consideration of the slip amount Δx due to the micro slip at the time when the speed ratio γ of the continuously variable transmission is a target value determined in advance. Consequently, also with the power transfer belt 10B which includes the elements 20B, it is possible to obtain functions and effects that are similar to those of the power transfer belt 10.

As has been described above, the present disclosure provides a method of designing an element (20, 20B) of a power transfer belt (10, 10B) to be wound around a primary pulley (3) and a secondary pulley (5) of a continuously variable transmission (1) to transfer torque, the element (20, 20B) having a saddle surface (23a) that contacts a ring (12, 12b) that bounds a plurality of the elements (20, 20B) annularly and a rocking edge portion (25) formed on one of a front surface and a back surface of the element (20, 20B) and including a contact line (25c) on which adjacent elements (20, 20B) contact each other and which serves as a support point for turning motion of the adjacent elements (20, 20B), in which a distance ($RE_O$) from a boundary line (25b1) between a surface positioned on an outer peripheral side of the power transfer belt (10, 10B) with respect to the rocking edge portion (25) and the rocking edge portion (25) to the saddle surface (23a) is determined from a slip amount (Δx) due to micro slip which is relative slipping between the element (20, 20B) and the primary pulley (3) caused when the primary pulley (3) pushes out the power transfer belt (10, 10B) toward the secondary pulley (5), and an angular speed (ωes) of the element (20, 20B) and an angular speed (ωrs) of the ring (12, 12B) in a range in which the power transfer belt (10, 10B) is wound around the secondary pulley (5).

In the power transfer belt which includes the plurality of elements, a slight clearance is formed between adjacent elements on the primary pulley side with respect to the exit from the secondary pulley. Therefore, a region called an idle arc, in which no torque is transferred with no pressing force generated between the elements because of the presence of the clearance, and a region called an active arc, in which torque is transferred with a pressing force generated between the elements which are brought closer to eliminate the clearance between the elements, are formed around the primary pulley. In the idle arc, the elements and the ring are rotated together with the primary pulley, and the angular speed of the elements and the angular speed of the ring coincide with each other. In the active arc, in contrast, when one element is pushed out from the primary pulley toward the secondary pulley, there occurs a phenomenon called micro slip, in which the elements in the active arc may not be moved together with the primary pulley with relative slipping caused between the elements and the primary pulley because of the absence of the pressing force of the one element.

The angular speed of the elements in the active arc is lower than the angular speed of the elements and the ring in the idle arc by an amount corresponding to the slip amount due to the micro slip. Thus, the micro slip in the active arc can be a factor that causes an angular speed difference between the element and the ring, which hinders a further reduction in the friction loss due to relative slipping between the element and the ring. In the method according to the present disclosure, in the light of the above, the distance from a boundary line between a surface positioned on the outer peripheral side of the power transfer belt with respect to the rocking edge portion, which includes the contact line, and the rocking edge portion to the saddle surface is determined from the slip amount due to micro slip, the angular speed of the element in a range in which the power transfer belt is wound around the secondary pulley, and the angular speed of the ring. Consequently, the friction loss due to relative slipping between the element and the ring can be further reduced by further reducing the angular speed difference between the element and the ring even if micro slip is caused. With the power transfer belt, as a result, it is possible to further improve the power transfer efficiency of the power transfer belt. Further, the durability of the power transfer belt can also be improved by reducing the friction due to relative slipping between the element and the ring.

The ring (12, 12B) may include a plurality of ring materials (11, 11B, 11i) stacked in a thickness direction; and the distance ($RE_O$) from the boundary line (25b1) to the saddle surface (23a) may be determined such that the angular speed (ωes) of the element (20, 20B) which is determined in consideration of the slip amount (Δx) due to the micro slip is not lower than an angular speed (ωrs) of an innermost ring material (11i) of the ring (12, 12B) in the range in which the power transfer belt (10, 10B) is wound around the secondary pulley (5). Consequently, it is possible to further reduce the friction loss due to relative slipping between the element and the ring by further reducing the angular speed difference between the element and the ring even if micro slip is caused.

When a winding radius around the primary pulley (3) is defined as "Rpri", a winding radius around the secondary pulley (5) is defined as "Rsec", a thickness of the element (20, 20B) is defined as "te", the slip amount due to the micro slip is defined as "Δx", the distance from the boundary line (25b1) to the saddle surface (23a) is defined as "$RE_O$", a radius of curvature of a curved surface that forms the rocking edge portion (25) is defined as "$r_{RE}$", an angle between the elements (20, 20B) which are wound around the primary pulley (3) and which are adjacent to each other is defined as "$\alpha_{pri}$", and an angle between the elements (20, 20B) which are wound around the secondary pulley (5) and which are adjacent to each other is defined as "$\alpha_{sec}$", the elements (20, 20B) may be designed so as to meet the above formula (4). Consequently, it is possible to determine the distance from the boundary line to the saddle surface while adequately reflecting the slip amount due to the micro slip in the angular speed of the element in the range in which the power transfer belt is wound around the secondary pulley.

The slip amount (Δx) due to the micro slip may be a slip amount at a time when a speed ratio (γ) of the continuously variable transmission (1) is less than a value of 1. That is, when the speed ratio of the continuously variable transmission is less than a value of 1, the angular speed difference between the element and the ring, which is due to the micro slip in the active arc, may be amplified on the secondary pulley side. Thus, it is possible to further improve the power transfer efficiency and the durability of the power transfer belt by determining the distance from the boundary line to the saddle surface in consideration of the slip amount due to the micro slip at the time when the speed ratio of the continuously variable transmission is less than a value of 1.

The slip amount (Δx) due to the micro slip may be a slip amount at a time when a speed ratio (γ) of the continuously variable transmission (1) is lowest. Consequently, it is possible to further improve the fuel efficiency of the vehicle on which the continuously variable transmission is mounted.

The slip amount ($\Delta x$) due to the micro slip may be a slip amount at a time when a vehicle speed of a vehicle on which the continuously variable transmission (1) is mounted is a maximum vehicle speed. Consequently, it is possible to further improve the efficiency at the time when the vehicle on which the continuously variable transmission 1 is mounted travels at a high speed.

The slip amount ($\Delta x$) due to the micro slip may be determined on the basis of a total value of clearances between the adjacent elements (20, 20B) and the number of elements (20, 20B) which are positioned between an exit from the secondary pulley (5) to a terminal end of an idle arc (Ai).

The element (20) may include a body portion (21) that has the saddle surface (23a) and a pair of pillar portions (22) positioned on both sides, in a width direction, of the saddle surface (23a) to extend from the body portion (21) toward the outer peripheral side of the power transfer belt (10).

The element (20B) may include a body portion (21B), a neck portion (26) that extends from a center portion, in a width direction, of the body portion (21B) toward an outer peripheral side of the power transfer belt (10B), and a head portion (27) that extends from the neck portion (26) toward both sides in the width direction with spacing from the body portion (21B); and the saddle surface (23a) may be formed on the body portion (21B) so as to be positioned on both sides, in the width direction, of the neck portion (26).

The present disclosure also provides a power transfer belt (10, 10B) that includes a plurality of elements (20, 20B) and a ring (12, 12B) that binds the plurality of elements (20, 20B) annularly, the power transfer belt (10, 10B) being wound around a primary pulley (3) and a secondary pulley (5) of a continuously variable transmission (1) to transfer power, in which: the elements (20, 20B) each include a saddle surface (23a) that contacts the ring (12, 12B), and a rocking edge portion (25, 25B) formed on one of a front surface and a back surface of the element (20, 20B) and including a contact line (25c) on which adjacent elements (20, 20B) contact each other and which serves as a support point for turning motion of the adjacent elements (20, 20B); and a distance ($RE_O$) from a boundary line (25b1) between a surface positioned on an outer peripheral side of the power transfer belt (10, 10B) with respect to the rocking edge portion (25, 25B) and the rocking edge portion (25, 25B) to the saddle surface (23a) is determined from a slip amount ($\Delta x$) due to micro slip which is relative slipping between the element (20, 20B) and the primary pulley (3) caused when the primary pulley (3) pushes out the power transfer belt (10, 10B) toward the secondary pulley (5), and an angular speed ($\omega es$) of the element (20, 20B) and an angular speed ($\omega rs$) of the ring (12, 12B) in a range in which the power transfer belt (10, 10B) is wound around the secondary pulley (5).

In the power transfer belt according to the present disclosure, the distance from a boundary line between a surface positioned on the outer peripheral side of the power transfer belt with respect to the rocking edge portion, which includes the contact line, and the rocking edge portion to the saddle surface is determined from the slip amount due to micro slip, the angular speed of the element in a range in which the power transfer belt is wound around the secondary pulley, and the angular speed of the ring. Consequently, the friction loss due to relative slipping between the element and the ring can be further reduced by further reducing the angular speed difference between the element and the ring even if micro slip is caused. As a result, it is possible to further improve the power transfer efficiency of the power transfer belt. Further, the durability of the power transfer belt can also be improved by reducing the friction due to relative slipping between the element and the ring.

The ring (12) may include a plurality of ring materials (11, 11B, 11i) stacked in a thickness direction; and the distance ($RE_O$) from the boundary line (25b1) to the saddle surface (23a) may be determined such that the angular speed ($\omega es$) of the element (20, 20B) which is determined in consideration of the slip amount ($\Delta x$) due to the micro slip is not lower than an angular speed ($\omega rs$) of an innermost ring material (11i) of the ring (12) in the range in which the power transfer belt (10, 10B) is wound around the secondary pulley (5). Consequently, it is possible to further reduce the friction loss due to relative slipping between the element and the ring by further reducing the angular speed difference between the element and the ring even if micro slip is caused.

When a winding radius around the primary pulley (3) is defined as "Rpri", a winding radius around the secondary pulley (5) is defined as "Rsec", a thickness of the element (20, 20B) is defined as "te", the slip amount due to the micro slip is defined as "$\Delta x$", the distance from the boundary line (25b1) to the saddle surface (23a) is defined as "$RE_O$", a radius of curvature of a curved surface that forms the rocking edge portion (25) is defined as "$r_{RE}$", an angle between the elements (20, 20B) which are wound around the primary pulley (3) and which are adjacent to each other is defined as "$\alpha_{pri}$", and an angle between the elements (20, 20B) which are wound around the secondary pulley (5) and which are adjacent to each other is defined as "$\alpha_{sec}$", the power transfer belt (10, 10B) according to the present disclosure may meet the above formula (4). Consequently, it is possible to determine the distance from the boundary line to the saddle surface while adequately reflecting the slip amount due to the micro slip.

The slip amount ($\Delta x$) due to the micro slip may be a slip amount at a time when a speed ratio ($\gamma$) of the continuously variable transmission (1) is less than a value of 1. That is, when the speed ratio of the continuously variable transmission is less than a value of 1, the angular speed difference between the element and the ring, which is due to the micro slip in the active arc, may be amplified on the side of the secondary pulley. Thus, it is possible to further improve the power transfer efficiency and the durability of the power transfer belt by determining the distance from the boundary line to the saddle surface in consideration of the slip amount due to the micro slip at the time when the speed ratio of the continuously variable transmission is less than a value of 1.

The slip amount ($\Delta x$) due to the micro slip may be a slip amount at a time when a speed ratio (7) of the continuously variable transmission (1) is lowest. Consequently, it is possible to further improve the fuel efficiency of the vehicle on which the continuously variable transmission is mounted.

The slip amount ($\Delta x$) due to the micro slip may be a slip amount at a time when a vehicle speed of a vehicle on which the continuously variable transmission (1) is mounted is a maximum vehicle speed. Consequently, it is possible to further improve the efficiency at the time when the vehicle on which the continuously variable transmission 1 is mounted travels at a high speed.

The slip amount ($\Delta x$) due to the micro slip may be determined on the basis of a total value of clearances between the adjacent elements (20, 20B) and the number of elements (20, 20B) which are positioned between an exit from the secondary pulley (5) to a terminal end of an idle arc (Ai).

The elements (20) may each include a body portion (21) that has the saddle surface (23a) and a pair of pillar portions (22) positioned on both sides, in a width direction, of the saddle surface (23a) to extend from the body portion (21) toward the outer peripheral side of the power transfer belt (10).

The elements (20B) may each include a body portion (21B), a neck portion (26) that extends from a center portion, in a width direction, of the body portion (21B) toward an outer peripheral side of the power transfer belt (10B), and a head portion (27) that extends from the neck portion (26) toward both sides in the width direction with spacing from the body portion (21B); and the saddle surface (23a) may be formed on the body portion (21B) so as to be positioned on both sides, in the width direction, of the neck portion (26).

The invention according to the present disclosure is not limited to the embodiment described above in any way, and it is a matter of course that the invention may be modified in various ways without departing from the range of the extension of the present disclosure. Further, the embodiment described above is merely a specific form of the invention described in the "SUMMARY OF THE DISCLOSURE" section, and does not limit the elements of the invention described in the "SUMMARY OF THE DISCLOSURE" section.

INDUSTRIAL APPLICABILITY

The aspects of the present disclosure are applicable to the power transfer belt and continuously variable transmission manufacturing industry, etc.

The invention claimed is:

1. A method of designing an element of a power transfer belt to be wound around a primary pulley and a secondary pulley of a continuously variable transmission to transfer torque, the element having a saddle surface that contacts a ring that bounds a plurality of the elements annularly and a rocking edge portion formed on one of a front surface and a back surface of the element and including a contact line on which adjacent elements contact each other and which serves as a support point for turning motion of the adjacent elements, wherein
   a distance from a boundary line between a surface positioned on an outer peripheral side of the power transfer belt with respect to the rocking edge portion and the rocking edge portion to the saddle surface is determined from a slip amount due to micro slip which is relative slipping between the element and the primary pulley caused when the primary pulley pushes out the power transfer belt toward the secondary pulley, and an angular speed of the element and an angular speed of the ring in a range in which the power transfer belt is wound around the secondary pulley.

2. The method of designing an element according to claim 1, wherein:
   the ring includes a plurality of ring materials stacked in a thickness direction; and
   the distance from the boundary line to the saddle surface is determined such that the angular speed of the element which is determined in consideration of the slip amount due to the micro slip is not lower than an angular speed of an innermost ring material of the ring in the range in which the power transfer belt is wound around the secondary pulley.

3. The method of designing an element according to claim 2, wherein
   when a winding radius around the primary pulley is defined as "Rpri",
   a winding radius around the secondary pulley is defined as "Rsec",
   a thickness of the element is defined as "te",
   the slip amount due to the micro slip is defined as "$\Delta x$",
   the distance from the boundary line to the saddle surface is defined as "$RE_0$",
   a radius of curvature of a curved surface that forms the rocking edge portion is defined as "$r_{RE}$",
   an angle between the elements which are wound around the primary pulley and which are adjacent to each other is defined as "$\alpha_{pri}$", and
   an angle between the elements which are wound around the secondary pulley and which are adjacent to each other is defined as "$\alpha_{sec}$",
   the elements are designed so as to meet the following formula (1)

[Expression 1]

$$\frac{Rpri}{R\sec} \cdot \frac{te}{te + \Delta x} \geq \frac{Rpri + RE_0 + r_{RE} \cdot \sin\alpha_{pri}}{R\sec + RE_0 + r_{RE} \cdot \sin\alpha_{sec}} \quad (1)$$

4. The method of designing an element according to claim 3, wherein
   the slip amount due to the micro slip is a slip amount at a time when a speed ratio of the continuously variable transmission is less than a value of 1.

5. The method of designing an element according to claim 4, wherein
   the slip amount due to the micro slip is a slip amount at a time when a speed ratio of the continuously variable transmission is lowest.

6. The method of designing an element according to claim 4, wherein
   the slip amount due to the micro slip is a slip amount at a time when a vehicle speed of a vehicle on which the continuously variable transmission is mounted is a maximum vehicle speed.

7. The method of designing an element according to claim 5, wherein
   the slip amount due to the micro slip is determined on the basis of a total value of clearances between the adjacent elements and the number of elements which are positioned between an exit from the secondary pulley to a terminal end of an idle arc.

8. The method of designing an element according to claim 7, wherein
   the element includes a body portion that has the saddle surface and a pair of pillar portions positioned on both sides, in a width direction, of the saddle surface to extend from the body portion toward the outer peripheral side of the power transfer belt.

9. The method of designing an element according to claim 7, wherein:
   the element includes a body portion, a neck portion that extends from a center portion, in a width direction, of the body portion toward an outer peripheral side of the power transfer belt, and a head portion that extends from the neck portion toward both sides in the width direction with spacing from the body portion; and
   the saddle surface is formed on the body portion so as to be positioned on both sides, in the width direction, of the neck portion.

10. The method of designing an element according to claim 1, wherein
when a winding radius around the primary pulley is defined as "Rpri",
a winding radius around the secondary pulley is defined as "Rsec",
a thickness of the element is defined as "te",
the slip amount due to the micro slip is defined as "Δx",
the distance from the boundary line to the saddle surface is defined as "$RE_0$",
a radius of curvature of a curved surface that forms the rocking edge portion is defined as "$r_{RE}$",
an angle between the elements which are wound around the primary pulley and which are adjacent to each other is defined as "$\alpha_{pri}$", and
an angle between the elements which are wound around the secondary pulley and which are adjacent to each other is defined as "$\alpha_{sec}$",
the elements are designed so as to meet the following formula (1)

[Expression 1]

$$\frac{Rpri}{R\sec} \cdot \frac{te}{te+\Delta x} \geq \frac{Rpri + RE_0 + r_{RE} \cdot \sin\alpha_{pri}}{R\sec + RE_0 + r_{RE} \cdot \sin\alpha_{sec}} \quad (1)$$

11. The method of designing an element according to claim 1, wherein
the slip amount due to the micro slip is a slip amount at a time when a speed ratio of the continuously variable transmission is less than a value of 1.

12. A power transfer belt that includes a plurality of elements and a ring that binds the plurality of elements annularly, the power transfer belt being wound around a primary pulley and a secondary pulley of a continuously variable transmission to transfer power, wherein:
the elements each include
a saddle surface that contacts the ring, and
a rocking edge portion formed on one of a front surface and a back surface of the element and including a contact line on which adjacent elements contact each other and which serves as a support point for turning motion of the adjacent elements; and
a distance from a boundary line between a surface positioned on an outer peripheral side of the power transfer belt with respect to the rocking edge portion and the rocking edge portion to the saddle surface is determined from a slip amount due to micro slip which is relative slipping between the element and the primary pulley caused when the primary pulley pushes out the power transfer belt toward the secondary pulley, and an angular speed of the element and an angular speed of the ring in a range in which the power transfer belt is wound around the secondary pulley.

13. The power transfer belt according to claim 12, wherein:
the ring includes a plurality of ring materials stacked in a thickness direction; and
the distance from the boundary line to the saddle surface is determined such that the angular speed of the element which is determined in consideration of the slip amount due to the micro slip is not lower than an angular speed of an innermost ring material of the ring in the range in which the power transfer belt is wound around the secondary pulley.

14. The power transfer belt according to claim 12, wherein
when a winding radius around the primary pulley is defined as "Rpri",
a winding radius around the secondary pulley is defined as "Rsec",
a thickness of the element is defined as "te",
the slip amount due to the micro slip is defined as "Δx",
the distance from the boundary line to the saddle surface is defined as "$RE_0$",
a radius of curvature of a curved surface that forms the rocking edge portion is defined as "$r_{RE}$",
an angle between the elements which are wound around the primary pulley and which are adjacent to each other is defined as "$\alpha_{pri}$", and
an angle between the elements which are wound around the secondary pulley and which are adjacent to each other is defined as "$\alpha_{sec}$",
the following formula (2) is met

[Expression 2]

$$\frac{Rpri}{R\sec} \cdot \frac{te}{te+\Delta x} \geq \frac{Rpri + RE_0 + r_{RE} \cdot \sin\alpha_{pri}}{R\sec + RE_0 + r_{RE} \cdot \sin\alpha_{sec}} \quad (2)$$

15. The power transfer belt according to claim 13, wherein
the slip amount due to the micro slip is a slip amount at a time when a speed ratio of the continuously variable transmission is less than a value of 1.

16. The power transfer belt according to claim 15, wherein
the slip amount due to the micro slip is a slip amount at a time when a speed ratio of the continuously variable transmission is lowest.

17. The power transfer belt according to claim 15, wherein
the slip amount due to the micro slip is a slip amount at a time when a vehicle speed of a vehicle on which the continuously variable transmission is mounted is a maximum vehicle speed.

18. The power transfer belt according to claim 16, wherein
the slip amount due to the micro slip is determined on the basis of a total value of clearances between the adjacent elements and the number of elements which are positioned between an exit from the secondary pulley to a terminal end of an idle arc.

19. The power transfer belt according to claim 18, wherein
the elements each include a body portion that has the saddle surface and a pair of pillar portions positioned on both sides, in a width direction, of the saddle surface to extend from the body portion toward the outer peripheral side of the power transfer belt.

20. The power transfer belt according to claim 18, wherein:
the elements each include a body portion, a neck portion that extends from a center portion, in a width direction, of the body portion toward an outer peripheral side of the power transfer belt, and a head portion that extends from the neck portion toward both sides in the width direction with spacing from the body portion; and the saddle surface is formed on the body portion so as to be positioned on both sides, in the width direction, of the neck portion.

\* \* \* \* \*